Figure 1:
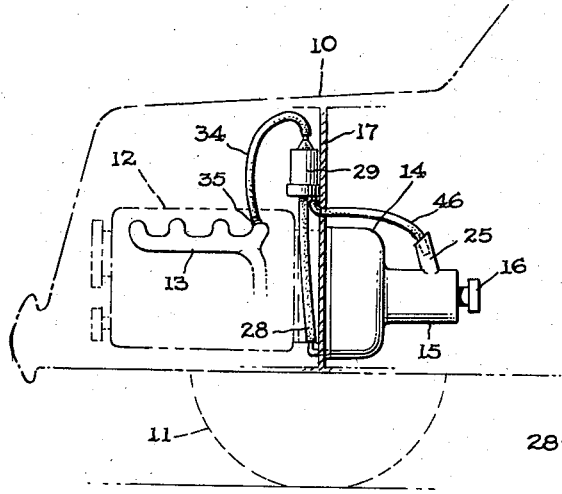

Oct. 14, 1958     H. WAHMANN     2,856,026

VACUUM OPERATED OIL RETURN

Filed April 16, 1957

INVENTOR

HERMAN WAHMANN

BY Cameron, Kerkam & Sutton

ATTORNEYS

United States Patent Office 2,856,026
Patented Oct. 14, 1958

2,856,026

VACUUM OPERATED OIL RETURN

Herman Wahmann, College Point, N. Y.

Application April 16, 1957, Serial No. 653,198

5 Claims. (Cl. 184—105)

This invention relates to vacuum operated oil returns and more particularly to such returns for pumping oil leaked past faulty front-end seals of automatic transmissions back to the transmission oil filler tube or to the transmission itself.

Most modern automotive vehicles employ an automatic transmission of one sort or another all of which have a front-end seal between the automatic transmission housing and the flywheel housing. This front-end seal surrounds the shaft from the flywheel to the automatic transmission and normally prevents leakage of the oil in the automatic transmission around this shaft into the flywheel housing. Upon use, this front-end seal may harden and crack and permit leakage of oil from the automatic transmission housing into the flywheel housing and from the flywheel housing to the ground. As much as four quarts of transmission oil per day can be lost in this way at great expense to the operator of the vehicle.

Replacement of worn front-end seals is a relatively expensive matter since the flywheel and automatic transmission assemblies must be taken down, the new front end seal substituted for the worn seal and the two assemblies then replaced in the vehicle. This requires the expenditure of much time and expensive labor.

By the present invention I have provided a relatively inexpensive vacuum oil return which is relatively simple and easy to install which collects oil leaking past the front-end seal of an automatic transmission and returns the oil without waste to the automatic transmission usually through the oil filler tube thereof.

It is therefore an object of the present invention to provide a novel vacuum operated oil return for collecting and returning oil leaking past the front-end seal of an automatic transmission to the automatic transmission.

Another object is to provide such a novel vacuum operated oil return which is relatively easy and inexpensive to install which obtains vacuum necessary for its pumping action from the intake manifold of the internal combustion engine.

Another object is to provide such a vacuum operated oil return which is of simple construction; relatively inexpensive to manufacture; and which requires a minimum of service, adjustment, and repair.

Another object is to provide such a vacuum operated oil return which requires for installation a minimum of modification of existing elements of the flywheel housing and intake manifold of the internal combustion engine.

Another object is to provide such a vacuum operated oil return which is of relatively small size and compact so as to be readily installed in the engine compartment of the modern automobile.

Other and further objects of the present invention will appear from the following description of an illustrative embodiment thereof.

The vacuum operated oil return of the present invention is capable of various mechanical embodiments one of which is shown in the accompanying drawing and is described hereinafter to illustrate the invention. This illustrative embodiment of the present invention should in no way be construed as defining or limiting the invention and reference should be had to the appended claims for a determination of the scope of the present inventive concept.

Figure 2:
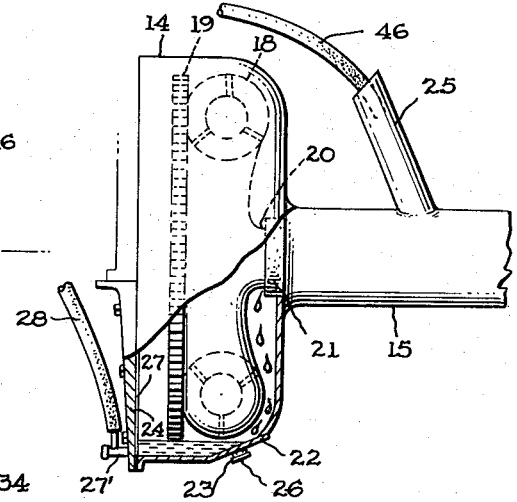
Figure 3:
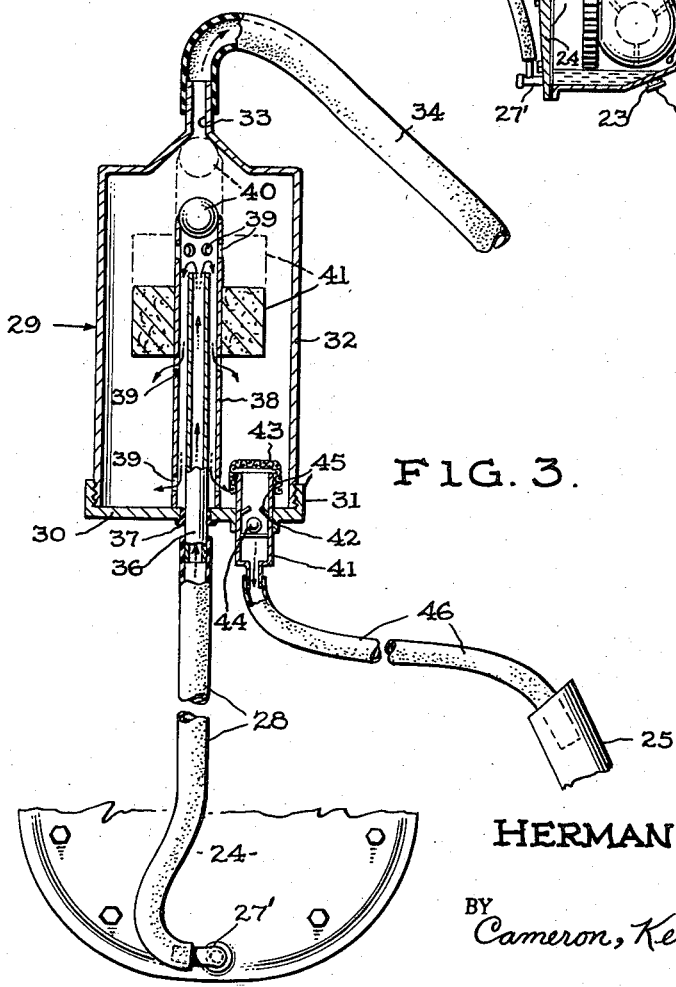

In the accompanying drawing, in which like reference characters indicate like parts, Fig. 1 is a partial view of an automotive vehicle the outline of which is shown in broken line showing the relative position of the internal combustion engine thereof, the flywheel housing, the automatic transmission housing, the coupling to the drive shaft, and a suitable location for an embodiment of the vacuum operated oil return of the present invention;

Fig. 2 is an enlarged detail of a part of Fig. 1, partly in section, showing a typical flywheel housing and the location of the front-end seal; and Fig. 3 is an elevation, partly in section, of an illustrative embodiment of the vacuum operated oil return of the present invention.

Referring now to the several figures, 10 is the outline of an internal combustion engine driven vehicle mounted upon suitable wheels 11 and provided with a suitable internal combustion engine 12 having a conventional intake manifold 13. At the rear of engine 12 is flywheel housing 14 and associated therewith is automatic transmission housing 15, the coupling for the drive shaft to the rear wheels being shown at 16. A fire wall 17 separates the engine compartment of the vehicle from the balance of the vehicle in a conventional manner.

Flywheel housing 14 encloses flywheel 18 which is provided in known manner with the ring gear 19 to be engaged by the starter of the engine. Flywheel shaft 20 extends into automatic transmission housing 15 through front-end seal 21. Housing 14 is provided in a conventional manner with a bottom closure plate 22 having a drain opening 23 and a front closure plate 24.

Automatic transmission housing 15 is filled with oil in a conventional manner through a suitable filler tube 25, it being understood that housing 15 may enclose any one of a number of automatic transmissions conventionally used with motor vehicles today.

When front-end seal 21 ages, dries out, and cracks transmission oil from automatic transmission housing 15 will leak around shaft 20 and drop to the bottom of housing 14 where it normally will drain to the ground through drain opening 23. In accordance with the present concept, I close opening 23 by a suitable plug 26 and provide gaskets where required as between housing 14 and plate 24 at 27 to form a fluid tight chamber in the bottom of housing 14 where the oil leaking past seal 21 may collect. A suitable fitting 27' is then provided at the lowest point of housing 14 and fitting 27' is connected by tube 28 with the vacuum operated oil return generally shown at 29. Structure 29 includes a base plate 30 having an upstanding annular internally threaded flange 31 which receives a cylindrical dome 32. Dome 32 is provided at its upper end with a conical outlet 33 which is connected by flexible conduit 34 to fitting 35 mounted in intake manifold 13. A tube 36 is mounted in conduit 28 and passes through a central aperture and gasket 37 in base plate 30 and extends upwardly in dome 32 for a substantial distance. A sleeve 38 is mounted loosely over tube 36 in dome 32; is provided with a suitable number of openings 39; and is closed at its upper end by a ball 40. A float 41 is secured to tube 38 adjacent its upper end where it does not block any of the openings 39. An outlet tube 41 passes through opening 42 in base 30 and is closed at its end within dome 32 by screen 43. A ball type check valve 44 is mounted within tube 41 and closes when seated against valve seat 45. Outlet tube 41 is connected by flexible conduit 46 to intake 25 of automatic transmission housing 15.

The vacuum operated oil return 29 may be suitably positioned anywhere within the engine enclosure so long as dome 32 is above oil filler tube 25 and may be mounted conveniently on and secured to fire wall 17 as shown in Fig. 1.

The embodiment of the present invention described above is operative during the normal running of engine 12. When engine 12 is running at normal speeds without acceleration a vacuum will be drawn on conduit 34 by the vacuum existing in intake manifold 13, a vacuum will then be drawn in dome 32 and conduit 28 thus drawing any oil collected in the bottom of housing 14 through conduit 28 into the bottom of dome 32. The vacuum drawn in dome 32 will lift check valve 44 and seat it in seat 45 to prevent air from being drawn through conduit 46 to break the vacuum.

When engine 12 is accelerated the vacuum in intake manifold 13 will be broken, breaking the vacuum in dome 32 and check valve 44 will drop away from seat 45 permitting any oil collected in dome 32 to pass through screen 43 and conduit 46 back to the automatic transmission housing 15.

Should check valve 44 stick in closed position or if for any other reason the oil collected in dome 32 fails to pass through conduit 46 to intake 25 the rising oil in dome 32 will lift float 41 and eventually seat ball 40 in the mouth of conical opening 33 to prevent oil from being drawn into the intake manifold 13.

It will now be seen that the present invention in every way satisfies the several objectives described above.

Changes in and modifications to the above described illustrative embodiment of this invention may now be suggested to those skilled in the art without departing from the present inventive concept. Reference should therefore be had to the appended claims to determine the scope of the present invention.

What is claimed is:

1. In a vacuum operated oil return for an automatic transmission having a front-end seal between the transmission housing and the flywheel housing connected to an internal combustion engine having an intake manifold, a conduit opening into the low point of the flywheel housing, a chamber above the transmission housing connected to said conduit, a conduit connecting said chamber and the intake manifold, a drain conduit from said chamber to the transmission housing and a check valve in said drain conduit closed when a vacuum is drawn on said chamber by a vacuum in the intake manifold.

2. In a vacuum operated oil return for an automatic transmission having a front-end seal between the transmission housing and a fluid-tight flywheel housing connected to an internal combustion engine having an intake manifold, a chamber above the transmission housing, a conduit connecting said chamber and the low point of the flywheel housing, a second conduit connecting said chamber and the intake manifold, check valve means closing said second conduit upon excessive accumulation of oil in said chamber, a drain conduit connecting said chamber and the transmission housing, and check valve means closing said drain conduit when a vacuum is drawn in said chamber by a vacuum in the intake manifold.

3. In a vacuum operated oil return for an automatic transmission having a front-end seal between the transmission housing and the fly wheel housing connected to an internal combustion engine having an intake manifold, a conduit opening into the low point of the fly wheel housing, a chamber above the transmission housing connected to said conduit, a conduit connecting said chamber to the intake manifold, a drain conduit from said chamber to the transmission housing, a check valve in said drain conduit closed when a vacuum is drawn on said chamber by a vacuum in the intake manifold, and a tube extending axially in said chamber and passing through a wall thereof and connected to said first named conduit.

4. In a vacuum operated oil return for an automatic transmission having a front-end seal between the transmission housing and the fly wheel housing connected to an internal combustion engine having an intake manifold, a conduit opening into the low point of the fly wheel housing, a chamber above the transmission housing connected to said conduit, a conduit connecting said chamber and the intake manifold, a drain conduit from said chamber to the transmission housing, a check valve in said drain conduit closed when a vacuum is drawn on said chamber by a vacuum in the intake manifold, a tube extending axially in said chamber and passing through a wall thereof and connected to said first named conduit, and a second tube loosely mounted on said first tube, a float secured to said second tube and a valve element carried by said second tube and closing said second conduit upon excessive accumulation of oil in said chamber.

5. In a vacuum operated oil return for an automatic transmission having a front-end seal between the transmission housing and the fly wheel housing connected to an internal combustion engine having an intake manifold, a conduit opening into the low point of the fly wheel housing, a chamber above the transmission housing connected to said conduit, a conduit connecting said chamber and the intake manifold, a drain conduit from said chamber to the transmission housing, a check valve in said drain conduit closed when a vacuum is drawn on said chamber by a vacuum in the intake manifold including a housing extending into said chamber, a screen covering the end of said housing in said chamber, a valve seat in said housing and a ball valve member cooperating with said seat and moved by gravity from said seat, said drain conduit being connected to said housing.

References Cited in the file of this patent

UNITED STATES PATENTS

| | | |
|---|---|---|
| 1,428,017 | Edwards | Sept. 5, 1922 |
| 2,595,969 | McFarland | May 6, 1952 |
| 2,665,955 | Brill | Jan. 12, 1954 |